United States Patent [19]

Viscio et al.

[11] Patent Number: 5,172,842
[45] Date of Patent: Dec. 22, 1992

[54] TOOL FOR BREAKING AND REMOVING TANG OF AN INSERTED WIRE COIL INSERT

[75] Inventors: Donald P. Viscio, Danbury; Peter C. Thomas, East Windsor; David W. Newton, Bethel, all of Conn.

[73] Assignee: Emhart, Inc., Newark, Del.

[21] Appl. No.: 808,155

[22] Filed: Dec. 13, 1991

[51] Int. Cl.[5] ............................................. B26D 7/18
[52] U.S. Cl. ...................................... 225/93; 225/103; 29/426.4
[58] Field of Search ............... 225/93, 103, 1; 83/100, 83/145, 146, 151, 639.1; 29/426.3, 426.4, 456; 81/488

[56] References Cited

U.S. PATENT DOCUMENTS

| | | | |
|---|---|---|---|
| 2,150,876 | 3/1939 | Caminez | 29/456 X |
| 2,976,753 | 3/1961 | Fowler et al. | 83/151 X |
| 3,459,350 | 8/1969 | Wahn | 225/93 X |
| 3,552,615 | 1/1971 | Murray | 225/93 X |
| 4,227,290 | 10/1980 | Wallace | 29/456 X |

Primary Examiner—Eugenia Jones
Attorney, Agent, or Firm—Spencer T. Smith

[57] ABSTRACT

The magnetized punch of the tool breaks off the tang and holds the tang until the punch is withdrawn into an opening in a vacuum conduit. The tang is thereby removed from the punch and it becomes entrained in a vacuum flow, detected and accounted for before passing into a collection chamber.

3 Claims, 2 Drawing Sheets

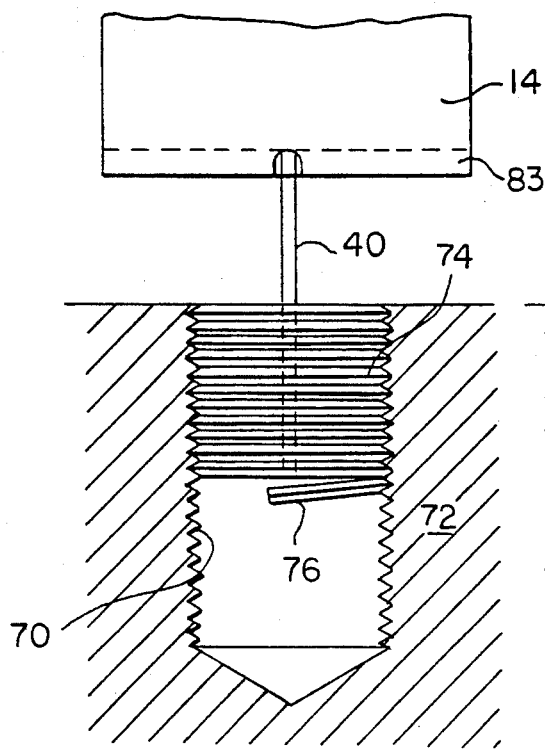
FIG. 2
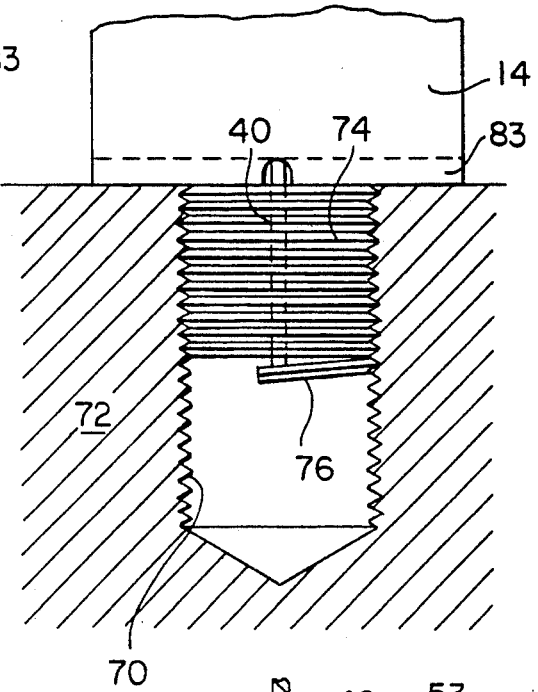
FIG. 3
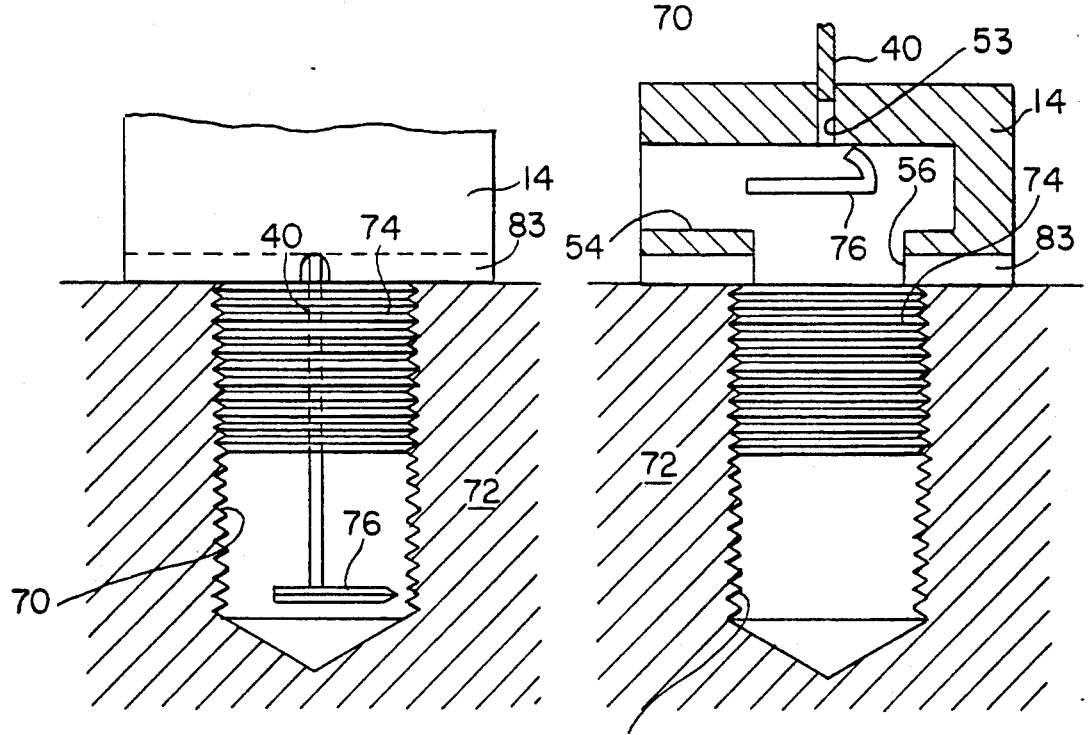
FIG. 4
FIG. 5

TOOL FOR BREAKING AND REMOVING TANG OF AN INSERTED WIRE COIL INSERT

The present invention relates to wire coil inserts for screw connections.

Wire coil inserts such as are disclosed in U.S. Pat. No. 2,150,876 conventionally have a diametrical tang which is engaged by an insertion tool and rotatively driven to insert the wire coil insert. The tang may then be broken off usually by subjecting the tang to a forceful strike. If breaking the tang is a requirement, then it must be recovered to maintain the integrity of the environment into which the wire coil insert is secured. This is a particularly difficult problem when the wire coil insert is located in a blind bore.

Assemblers have used a number of techniques to recover these tangs. The workpiece may be turned upside down to drop the tang out of the blind hole or a magnetic probe may be used to find the broken off tang within the blind bore.

It is accordingly an object of the present invention to provide an improved tool for recovering broken off tangs.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 2 is an elevational view of the bottom portion of the tool illustrated in FIG. 1 being inserted into an inserted wire coil insert;

FIG. 3 is a view similar to FIG. 2 just prior to the tang being broken;

FIG. 4 is a view similar to FIG. 3 after the tang has been broken; and

FIG. 5 is a view similar to FIG. 4 showing a portion of the tool in cross section showing how the broken off tang is recovered.

Figure 1:
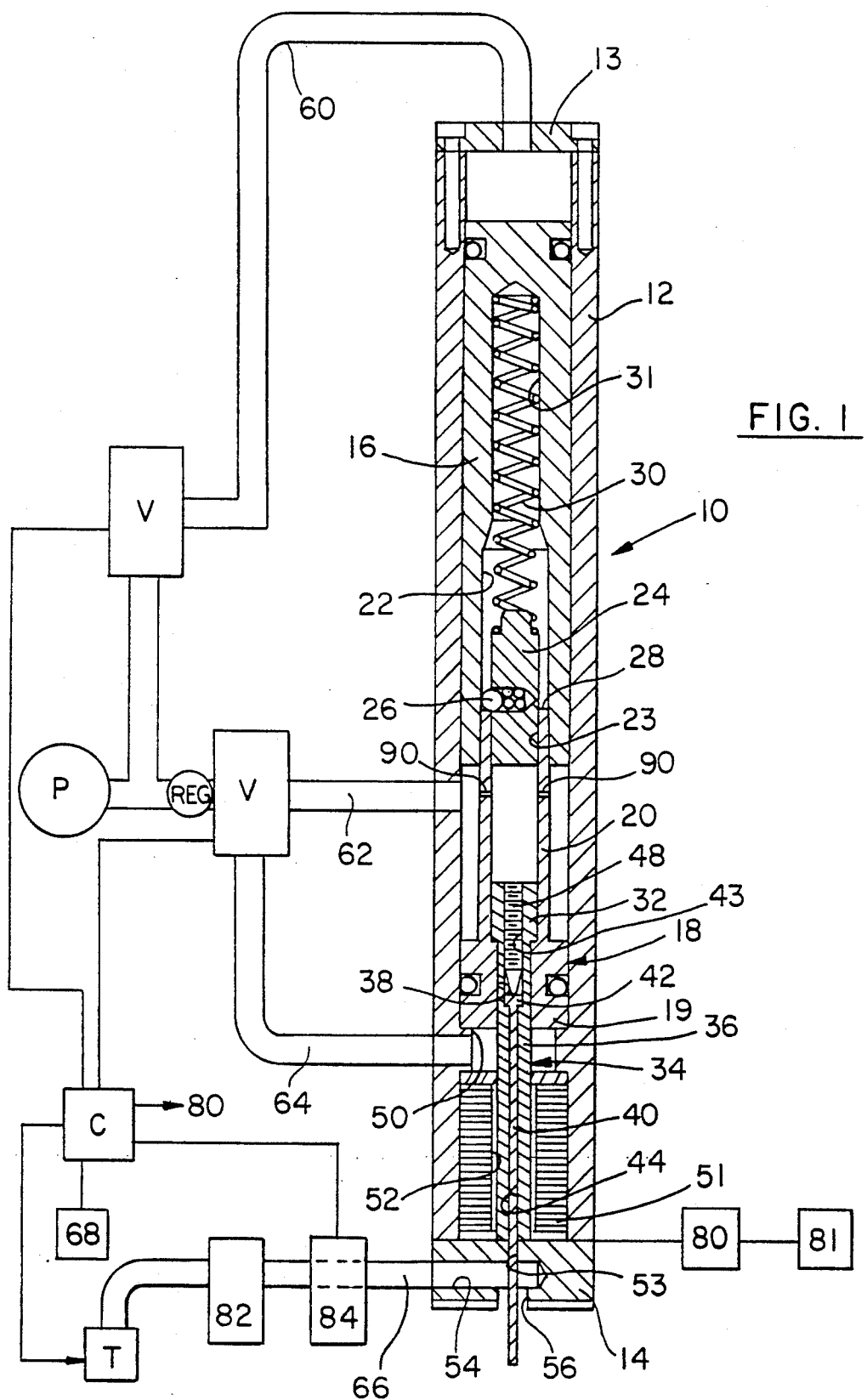
FIG. 1 is an elevational view of the tool for breaking and removing the tang of an inserted wire coil insert made in accordance with the teachings of the present invention.

The tang break-off and removal tool 10 has a cylindrical outside barrel 12 which is closed at the top by an end cap 13 and at the bottom by a block 14. Displaceable within the barrel is a piston 16 and a movable stop 18 which has a head portion 19 and a hollow reduced diameter portion 20 telescopically received within an inner bore 22 of the piston 16. Telescopically received within the upper bore portion 23 of the stop 18 is a hammer 24 which carries a ball detent 26 which is located to cooperate with the top end 28 of the reduced diameter portion 20. The detent is normally forced against this top end by a spring 30 which is located within an upper piston bore 31 and which is compressively located between the piston 16 and the hammer 24.

Also telescopically received within the upper bore portion 23 is the head 32 of a punch holder 34. The reduced diameter elongated body 36 of the punch holder 34 passes through a reduced diameter bore 38 of the head 32. The punch holder 15 thereby displaceable between the head portion 19 of the complete movable stop 18 and the hammer 24. The "T" shaped punch 40 is dropped in the punch holder and the "T" portion 42 will rest on the annular step defined where the upper 43 and lower 44 punch holder bores merge. A screw 48 which is received by the tapped upper bore 43 holds the punch inside the punch holder. Downward displacement of the stop is limited by a reduced diameter barrel bore 50.

Located between this reduced diameter barrel bore 50 and the block 14 is an electromagnet 51 which has a central bore 52 through which the punch holder passes. The punch 40 passes through a corresponding bore 53 in the block through an enlarged vacuum port 54 and then through an enlarged hole 56 at the bottom of the block. The punch and punch holder are made from steel which is easily magnetized.

As shown in FIG. 1, the tool is ready for use. Controller C operates valve block V which is connected to a source of air under pressure P, so that piston advance air (high pressure) 60 is off, punch advance air (low pressure) 62 is on and punch retract air (low pressure) 64 is off. The controller also turns off the transducer T so that the vacuum line 66 is off. The operator manipulates the tool 10 to insert the projecting portion of the punch 40 into the threaded blind bore 70 of work piece 72 which has already received a coil wire insert 74 (FIG. 2). Once the punch 40 engages the tang 76 further downward displacement of the tool will result in the punch being forced upwardly against the pressure of the punch advance air 62 (FIG. 3). The operator then activates a switch 68 and the controller now turns piston advance air 60 on while turning punch advance air 62 off. The piston moves downwardly increasing the compression of the spring 30 until it overcomes the detent 26. The hammer 24 is released and propels downwardly until it strikes the punch holder driving the punch down to its lowermost position. This breaks off the tang. Before the hammer is released the controller closes the switch 80 to connect the electromagnet to its power source 81 to magnetize the punch (a permanent magnet could also be used). When the detent releases the hammer, the controller turns off the piston advance air 60 and following the breaking of the tang turns on the punch return air 64 to raise the complete movable stop 18 and hence the punch (holding the broken off tang) up through the bottom block openings 53, 56 and also turns on the vacuum transducer T. At this time, the electromagnet is turned off. The tang, when it is removed from the punch as the punch retracts into the upper block hole 53 (FIG. 5), will be sucked out of the block, drawn through the vacuum or collection port 54 and through the collection tube 66 into the collection tank 82. Grooves 83 are cut on the bottom of the block 14 to connect atmospheric air to the vacuum line 66. The tang will be sensed by a ring proximity sensor 84 and whenever the sensor 84 fails to sense a tang a fault indicator light and/or audio signal (not shown) can be operated. At this time, the vacuum is turned off. As soon as the punch is fully retracted punch retract air 64 is turned off and stop return air 62 is turned on to return the piston to its topmost position, elevate the detent to its active position and return the punch to its fully extended position (holes 90 in the upper stop portion 20 permit air under pressure into the interior bore 23).

We claim:
1. A tool for breaking off and recovering the tang of a wire coil insert which is installed in a hole comprising
   a magnetizable punch,
   a housing for supporting said punch for displacement in a selected direction, means for displacing said punch from a first position engaging the tang to a second position so that the displacement of said punch will result in said punch breaking off the tang from the insert, means for magnetizing said punch so that said punch will be magnetized during said displacement and for maintaining said magnetism until said punch is displaced to a third position vertically above said first position, means for displacing said punch from said second position to said third position, means for stripping the tang which is magnetically secured to said magnetized punch as said punch is displaced from said second position to said third position, and vacuum means for recovering the tang stripped from said punch.

2. A tool according to claim 1 wherein said stripping means comprises a block secured to the bottom of said housing, said block including a tang collecting conduit, a lower aperture communicating with said tang collecting conduit through which said punch will travel as it is displaced from said second position to said third position, said lower aperture being selectively sized to permit passage of a tang magnetically secured to said punch and an upper aperture also communicating with said tang collecting conduit through which said punch will pass as it is displaced from said second position to said third position and selectively sized so that a tang magnetically secured to said punch will be stripped from said punch and dropped into said tang collecting conduit as said punch is displaced from said second position to said third position.

3. A tool according to claim 2, further comprising tang collection means including collection tube means connected to said tang collection conduit and means for verifying that a tang broken off an inserted wire coil insert has been pulled through said tang collection tube means.

* * * * *